(12) United States Patent
Chan et al.

(10) Patent No.: US 11,044,592 B2
(45) Date of Patent: *Jun. 22, 2021

(54) ELECTRONIC DEVICE SYSTEM RESTORATION BY TAPPING MECHANISM

(71) Applicant: Razer (Asia-Pacific) Pte. Ltd., Singapore (SG)

(72) Inventors: Michael A. Chan, San Francisco, CA (US); Tom Moss, Los Altos, CA (US); Daniel R Bornstein, San Francisco, CA (US); Michael K Fleming, San Francisco, CA (US); Justin Quan, San Francisco, CA (US); Linda Tong, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 236 days.

This patent is subject to a terminal disclaimer.

(21) Appl. No.: 16/148,204

(22) Filed: Oct. 1, 2018

(65) Prior Publication Data
US 2019/0037375 A1    Jan. 31, 2019

Related U.S. Application Data

(63) Continuation of application No. 14/042,509, filed on Sep. 30, 2013, now Pat. No. 10,123,189.
(Continued)

(51) Int. Cl.
*H04W 4/60* (2018.01)
*G06F 16/27* (2019.01)
(Continued)

(52) U.S. Cl.
CPC .............. *H04W 4/60* (2018.02); *G06F 16/27* (2019.01); *H04L 67/1095* (2013.01); *H04W 4/80* (2018.02)

(58) Field of Classification Search
None
See application file for complete search history.

(56) References Cited

U.S. PATENT DOCUMENTS 6,811,486 B1    11/2004 Luciano, Jr.
7,315,740 B2    1/2008  Maes
(Continued)

FOREIGN PATENT DOCUMENTS

EP    2 680 207 A1    1/2014

OTHER PUBLICATIONS

U.S. Appl. No. 14/479,087 by Chan, M.A et al., filed Sep. 5, 2014.
(Continued)

*Primary Examiner* — Amresh Singh
(74) *Attorney, Agent, or Firm* — Mattingly & Malur, PC (57) ABSTRACT

Some examples include detecting that a source computing device is in proximity to a target computing device. For instance, a user credential of the source computing device may be received from the source computing device. Further, a copy of system data of the source computing device may be retrieved from a cloud storage service. A system state of the source computing device may be restored on the target computing device by using the user credential received from the source computing device and the copy of the system data of the source computing device retrieved from the cloud storage. In some cases, the user credential may expire on the target computing device after a predetermined system event in the target computing device.

20 Claims, 6 Drawing Sheets

Related U.S. Application Data (60) Provisional application No. 61/804,134, filed on Mar. 21, 2013, provisional application No. 61/866,475, filed on Aug. 15, 2013.

(51) Int. Cl.
*H04L 29/08* (2006.01)
*H04W 4/80* (2018.01)

(56) References Cited

U.S. PATENT DOCUMENTS

| | | | |
|---|---|---|---|
| 7,326,117 | B1 | 2/2008 | Best |
| 7,490,045 | B1 | 2/2009 | Flores et al. |
| D611,494 | S | 3/2010 | Akiyoshi et al. |
| 7,752,450 | B1 * | 7/2010 | Palmer ............ G06Q 20/206 713/183 |
| 7,774,457 | B1 | 8/2010 | Talwar et al. |
| 7,903,383 | B2 | 3/2011 | Fukano et al. |
| 8,005,956 | B2 | 8/2011 | Williams et al. |
| D646,695 | S | 10/2011 | Hoggarth et al. |
| 8,234,348 | B1 | 7/2012 | Tulchinsky et al. |
| 8,290,920 | B2 | 10/2012 | Mahajan et al. |
| 8,315,977 | B2 | 11/2012 | Anand et al. |
| 8,423,511 | B1 | 4/2013 | Bhatia |
| D682,874 | S | 5/2013 | Frijlink et al. |
| 8,438,298 | B2 | 5/2013 | Arai et al. |
| D683,737 | S | 6/2013 | Brinda et al. |
| 8,473,577 | B2 | 6/2013 | Chan |
| 8,475,275 | B2 | 7/2013 | Parks et al. |
| 8,494,576 | B1 | 7/2013 | Bye et al. |
| 8,495,129 | B2 | 7/2013 | Wolman et al. |
| 8,515,902 | B2 | 8/2013 | Savage |
| D689,505 | S | 9/2013 | Convay et al. |
| 8,539,567 | B1 | 9/2013 | Logue et al. |
| 8,577,292 | B2 | 11/2013 | Huibers |
| 8,589,140 | B1 | 11/2013 | Poulin |
| 8,606,948 | B2 | 12/2013 | Evans et al. |
| 8,666,938 | B1 | 3/2014 | Pancholy |
| 8,747,232 | B1 | 6/2014 | Quan et al. |
| 8,764,555 | B2 | 7/2014 | Quan et al. |
| 8,775,449 | B2 | 7/2014 | Quan et al. |
| D710,878 | S | 8/2014 | Jung |
| 8,812,601 | B2 | 8/2014 | Hsieh et al. |
| 8,840,461 | B2 | 9/2014 | Quan et al. |
| 8,868,859 | B2 | 10/2014 | Schmidt et al. |
| D718,334 | S | 11/2014 | Cranfill |
| 8,913,056 | B2 | 12/2014 | Zimmer et al. |
| D726,753 | S | 4/2015 | Angelides |
| D730,383 | S | 5/2015 | Brinda et al. |
| D731,537 | S | 6/2015 | Jeong et al. |
| D732,549 | S | 6/2015 | Kim |
| D734,775 | S | 7/2015 | Nagasawa et al. |
| D736,822 | S | 8/2015 | Tursi et al. |
| D737,852 | S | 9/2015 | De La Rosa et al. |
| 2001/0039212 | A1 | 11/2001 | Sawano et al. |
| 2002/0161908 | A1 | 10/2002 | Benitez et al. |
| 2003/0069037 | A1 | 4/2003 | Kiyomoto et al. |
| 2004/0018876 | A1 | 1/2004 | Kubota et al. |
| 2004/0203381 | A1 | 10/2004 | Cahn et al. |
| 2005/0147130 | A1 | 7/2005 | Hurwitz et al. |
| 2006/0030408 | A1 | 2/2006 | Kiiskinen |
| 2006/0073788 | A1 | 4/2006 | Halkka et al. |
| 2007/0130217 | A1 | 6/2007 | Linyard et al. |
| 2008/0055311 | A1 | 3/2008 | Aleksic et al. |
| 2008/0220878 | A1 | 9/2008 | Michaelis |
| 2009/0063690 | A1 | 3/2009 | Verthein et al. |
| 2009/0077263 | A1 | 3/2009 | Koganti et al. |
| 2009/0106110 | A1 | 4/2009 | Stannard et al. |
| 2009/0204966 | A1 | 8/2009 | Johnson et al. |
| 2009/0282125 | A1 | 11/2009 | Jeide et al. |
| 2010/0173712 | A1 | 7/2010 | Buhr |
| 2010/0235511 | A1 | 9/2010 | Kai |
| 2010/0257403 | A1 | 10/2010 | Virk et al. |
| 2010/0332401 | A1 | 12/2010 | Prahlad et al. |
| 2011/0076941 | A1 | 3/2011 | Taveau et al. |
| 2011/0078319 | A1 | 3/2011 | Ishida |
| 2011/0093567 | A1 | 4/2011 | Jeon et al. |
| 2011/0106755 | A1 | 5/2011 | Hao et al. |
| 2011/0126168 | A1 | 5/2011 | Ilyayev |
| 2011/0219105 | A1 | 9/2011 | Kryze et al. |
| 2011/0252071 | A1 | 10/2011 | Cidon |
| 2011/0275316 | A1 | 11/2011 | Suumaki et al. |
| 2011/0286026 | A1 | 11/2011 | Matsuzawa |
| 2011/0313922 | A1 | 12/2011 | Ben Ayed |
| 2012/0017236 | A1 | 1/2012 | Stafford et al. |
| 2012/0023250 | A1 | 1/2012 | Chen et al. |
| 2012/0028714 | A1 | 2/2012 | Gagner et al. |
| 2012/0036218 | A1 | 2/2012 | Oh et al. |
| 2012/0036239 | A1 | 2/2012 | Donaghey et al. |
| 2012/0064908 | A1 | 3/2012 | Fox et al. |
| 2012/0069131 | A1 | 3/2012 | Abelow |
| 2012/0079095 | A1 | 3/2012 | Evans et al. |
| 2012/0079126 | A1 | 3/2012 | Evans et al. |
| 2012/0084803 | A1 | 4/2012 | Johansson |
| 2012/0110568 | A1 | 5/2012 | Abel et al. |
| 2012/0128172 | A1 | 5/2012 | Alden |
| 2012/0149309 | A1 | 6/2012 | Hubner et al. |
| 2012/0171951 | A1 | 7/2012 | T Hooft |
| 2012/0203932 | A1 | 8/2012 | Da Costa et al. |
| 2012/0210343 | A1 | 8/2012 | McCoy et al. |
| 2012/0303778 | A1 | 11/2012 | Ahiska et al. |
| 2012/0311820 | A1 | 12/2012 | Chang |
| 2013/0007203 | A1 | 1/2013 | Szu |
| 2013/0008611 | A1 | 1/2013 | Marcus et al. |
| 2013/0044106 | A1 | 2/2013 | Shuster et al. |
| 2013/0045795 | A1 | 2/2013 | Fiedler |
| 2013/0086114 | A1 | 4/2013 | Wilson et al. |
| 2013/0117806 | A1 | 5/2013 | Parthasarathy et al. |
| 2013/0159890 | A1 | 6/2013 | Rossi |
| 2013/0219381 | A1 | 8/2013 | Lovitt |
| 2013/0223240 | A1 | 8/2013 | Hayes et al. |
| 2013/0225087 | A1 | 8/2013 | Uhm |
| 2013/0304898 | A1 | 11/2013 | Aggarwal et al. |
| 2013/0339058 | A1 | 12/2013 | Gotlib et al. |
| 2014/0040239 | A1 | 2/2014 | Hirsch |
| 2014/0053054 | A1 | 2/2014 | Shen et al. |
| 2014/0101300 | A1 | 4/2014 | Rosensweig et al. |
| 2014/0170978 | A1 | 6/2014 | Wolman et al. |
| 2014/0215030 | A1 | 7/2014 | Terwilliger et al. |
| 2014/0245203 | A1 | 8/2014 | Lee et al. |
| 2014/0379853 | A1 | 12/2014 | Shelton |
| 2015/0285388 | A1 | 10/2015 | Jeon et al. |

OTHER PUBLICATIONS

U.S. Appl. No. 14/479,140 by Chan, M.A et al., filed Sep. 5, 2014.
Non-Final Office Action dated May 27, 2014, U.S. Appl. No. 14/158,733 by Quan, J., et al., filed Jan. 17, 2014.
Non-Final Office Action dated Jun. 9, 2014, for U.S. Appl. No. 14/167,939 by Quan, J., et al., filed Jan. 29, 2014.
Restriction Requirement dated Jun. 12, 2014, for U.S. Appl. No. 14/251,463 by Quan, J., et al., filed Apr. 11, 2014.
Non-Final Office Action dated May 8, 2014, U.S. Appl. No. 14/179,744 by Quan, J., et al., filed Feb. 13, 2014.
Non-Final Office Action dated May 9, 2014, U.S. Appl. No. 14/160,444 by Quan, J., et al., filed Jan. 21, 2014.
Notice of Allowance dated May 14, 2014, Co-pending U.S. Appl. No. 14/158,715, by Quan et al., filed Jan. 17, 2014.
Notice of Allowance dated May 20, 2014, Co-pending U.S. Appl. No. 14/173,680, by Quan et al., filed Feb. 5, 2014.
Co-Pending Design U.S. Appl. No. 29/486,424 by Chan, M.A., et al., filed Mar. 28, 2014.
Co-Pending U.S. Appl. No. 14/042,398 by Chan, M.A., et al., filed Sep. 30, 2013.
Co-Pending U.S. Appl. No. 14/042,567 by Chan, M.A., et al., filed Sep. 30, 2013.
Co-Pending U.S. Appl. No. 14/179,709 by Quan, J., et al., filed Feb. 13, 2014.
Co-Pending U.S. Appl. No. 14/179,744 by Quan, J., et al., filed Feb. 13, 2014.
Co-Pending U.S. Appl. No. 14/221,174 by Chan, M.A., et al., filed Mar. 20, 2014.

(56) References Cited

OTHER PUBLICATIONS

Co-Pending U.S. Appl. No. 14/228,190 by Quan, J., et al., filed Mar. 27, 2014.
Co-Pending U.S. Appl. No. 14/251,463 by Quan, J., et al., filed Apr. 11, 2014.
Co-Pending U.S. Appl. No. 14/252,674 by Chan, M.A., et al., filed Apr. 14, 2014.
Co-Pending U.S. Appl. No. 14/267,823 by Chan, M.A., et al., filed May 1, 2014.
Non-Final Office Action dated Apr. 2, 2014, U.S. Appl. No. 14/179,709 by Quan, J., et al., filed Feb. 13, 2014.
Non-Final Office Action dated Apr. 3, 2014, U.S. Appl. No. 14/158,682 by Quan, J., et al., filed Jan. 17, 2004.
Non-Final Office Action dated Mar. 10, 2014, Co-pending U.S. Appl. No. 14/173,680, by Quan et al., filed Feb. 5, 2014.
Non-Final Office Action dated Mar. 7, 2014, Co-pending U.S. Appl. No. 14/158,715, by Quan et al., filed Jan. 17, 2014.
Notice of Allowance dated Apr. 15, 2014, Co-pending U.S. Appl. No. 14/167,834, by Quan et al., filed Jan. 29, 2014.
Co-Pending U.S. Appl. No. 13/772,163 by Quan, J., filed Feb. 20, 2013.
Co-Pending U.S. Appl. No. 14/043,034 by Chan, M.A., et al., filed Oct. 1, 2013.
Co-Pending U.S. Appl. No. 14/158,682 by Quan, J., et al., filed Jan. 17, 2004.
Co-Pending U.S. Appl. No. 14/158,715 by Quan, J., et al., filed Jan. 17, 2014.
Co-Pending U.S. Appl. No. 14/173,680 by Quan, J., et al., filed Feb. 5, 2014.
Co-Pending U.S. Appl. No. 14/167,834 by Quan, J., et al., filed Jan. 29, 2014.
Co-Pending U.S. Appl. No. 13/865,515 by Quan, J., et al., filed Apr. 18, 2013.
Co-Pending U.S. Appl. No. 14/158,733 by Quan, J., et al., filed Jan. 17, 2014.
Co-Pending U.S. Appl. No. 14/160,444 by Quan, J., et al., filed Jan. 21, 2014.
Co-Pending U.S. Appl. No. 14/167,939 by Quan, J., et al., filed Jan. 29, 2014.
International Search Report and Written Opinion dated Feb. 3, 2014, 7 pp., for International Application No. PCT/US13/62729 filed Sep. 30, 2013.
International Search Report and Written Opinion dated Feb. 3, 2014, 9 pp., for International Application No. PCT/US13/62986 filed Oct. 2, 2013.
International Search Report and Written Opinion dated Feb. 3, 2014, 7 pp., for International Application No. PCT/2013/62737 filed Sep. 30, 2013.
Co-Pending U.S. Appl. No. 14/179,709 by Quan et al., filed Feb. 13, 2014.
Co-Pending U.S. Appl. No. 14/179,744 by Quan et al., filed Feb. 13, 2014.
Kevin, "Android Automatic App Updates Part 2," Worldstart's Tech Tips And Computer Help, dated Apr. 10, 2012, Retrieved from the Internet URL: http:/fw.Nw.worldstart.com/android-automatic-app-updates-part-2, retrieved on Oct. 22, 2015, pp. 1-3.
Khan, S., "ZDBox For Android Is All-In-One Toolkit To Monitor And Manage Device," dated Mar. 4, 2011, Retrieved from the Internet URL: http://W'Nw.addictivetips.com/mobile/zdbox-for-android-is-all-in-one-toolkit-to-monitor-and-manage-device/, retrieved on Oct. 27, 2015, pp. 1-6.
Nickinson, P., "Add signature in gmail", Android Central, dated Nov. 29, 2010, Retrieved from the Internet URL: http:/lwww.androidcentral.com/add-signature-gmail, retrieved on Oct. 26, 2015, pp. 1-10.
Notice of Allowance dated Nov. 4, 2015 for U.S. Appl. No. 14/158,733 of Quan, J. et al., filed Jan. 17, 2014.
Ex Parte Quayle Action mailed Dec. 3, 2015, for U.S. Appl. No. 29/486,424, of Chan, M.A., et al., filed Mar. 28, 2014.
Notice of Allowance dated Jan. 11, 2016, for U.S. Appl. No. 14/042,398, of Chan, M.A., et al., filed Sep. 30, 2013.
Notice of Allowance dated Feb. 12, 2016, for U.S. Appl. No. 13/865,515, of Quan, J., et al., filed Apr. 18, 2013.
Notice of Allowance dated Feb. 12, 2016, for U.S. Appl. No. 14/228,190, of Quan, J., et al., filed Mar. 27, 2014.
Final Office Action dated Feb. 29, 2016, for U.S. Appl. No. 14/043,034, of Quan, J., et al., filed Oct. 1, 2013.
Non-Final Office Action dated May 15, 2015, for U.S. Appl. No. 14/042,398, by Chan, M.A., et al., filed Sep. 30, 2013.
Non-Final Office Action dated Jun. 22, 2015, for U.S. Appl. No. 14/043,034, of Quan, J., et al., filed Oct. 1, 2013.
Non-Final Office Action dated Jun. 22, 2015, for U.S. Appl. No. 14/158,682, of Quan, J., et al., filed Jan. 17, 2014.
Notice of Allowance dated Jul. 24, 2015, for U.S. Appl. No. 14/158,733, of Quan, J., et al., filed Jan. 17, 2014.
Non-Final Office Action dated Aug. 21, 2015, for U.S. Appl. No. 14/042,567, of Chan, M.A., et al., filed Sep. 30, 2013.
Notice of Allowance dated Sep. 2, 2015, for U.S. Appl. No. 14/042,398, of Chan, M.A., et al., filed Sep. 30, 2013.
Final Office Action dated Sep. 9, 2015, for U.S. Appl. No. 14/251,463, of Quan, J., et al., filed Apr. 11, 2014.
Notice of Allowance dated Oct. 2, 2015, for U.S. Appl. No. 14/228,190, of Quan, J., et al., filed Mar. 27, 2014.
Notice of Allowance dated Oct. 7, 2015, for U.S. Appl. No. 13/865,515, of Quan, J., et al., filed Apr. 18, 2013.
U.S. Appl. No. 14/804,696, of Quan, J., et al., filed Jul. 21, 2015.
U.S. Appl. No. 14/835,981, of Chu, B., et al., filed Aug. 26, 2015.
U.S. Appl. No. 14/836,032, of Quan, J., et al., filed Aug. 26, 2015.
U.S. Appl. No. 14/840,611, of Chan, M.A., et al., filed Aug. 31, 2015.
U.S. Appl. No. 14/840,636, of Chan, M.A., et al., filed Aug. 31, 2015.
McCormick, Z. and Schmidt, D. C., "Data Synchronization Patterns in Mobile Application Design," Vanderbilt University, pp. 1-14 (2012).
Notice of Allowance dated Oct. 29, 2014, for U.S. Appl. No. 14/167,939 by Quan, J., et al., filed Jan. 29, 2014.
Notice of Allowance dated Oct. 29, 2014, for U.S. Appl. No. 14/179,744 by Quan, J., et al, filed Feb. 13, 2014.
Notice of Allowance dated Nov. 25, 2014, for U.S. Appl. No. 14/252,674 by Chan, MA, et al, filed Apr. 14, 2014.
Non Final Office Action dated Dec. 3, 2014, for U.S. Appl. No. 14/251,463 by Quan, J., et al, filed Apr. 11, 2014.
Notice of Allowance dated Dec. 4, 2014, for U.S. Appl. No. 14/479,140 by Chan, MA, et al, filed Sep. 5, 2014.
Notice of Allowance dated Dec. 12, 2014, for U.S. Appl. No. 14/479,140 by Chan, MA, et al, filed Sep. 5, 2014.
Notice of Allowance dated Dec. 17, 2014, for U.S. Appl. No. 14/267,823 by Chan, MA, et al, filed May 1, 2014.
Notice of Allowance dated Dec. 19, 2014, for U.S. Appl. No. 14/479,140 by Chan, MA, et al, filed Sep. 5, 2014.
Notice of Allowance dated Dec. 22, 2014, for U.S. Appl. No. 14/179,744 by Quan, J., et al, filed Feb. 13, 2014.
Final Office Action dated Dec. 23, 2014, for U.S. Appl. No. 14/158,733 by Quan, J., et al, filed Jan. 17, 2014.
Notice of Allowance dated Mar. 17, 2015, for U.S. Appl. No. 14/158,733, Quan, J., et al, filed Jan. 17, 2014.
Notice of Allowance dated Mar. 30, 2015, for U.S. Appl No. 13/772,163, Quan, J., filed Feb. 20, 2013.
Notice of Allowance dated Mar. 30, 2015, for U.S. Appl. No. 14/267,823, Chan, MA, et al, filed May 1, 2014.
Non-Final Office Action dated Apr. 8, 2015, for U.S. Appl. No. 13/865,515, Quan, J., et al, filed Apr. 18, 2013.
Non-Final Office Action dated Apr. 8, 2015, for U.S. Appl. No. 14/228,190, Quan, J., et al, filed Mar. 27, 2014.
Notice of Allowance dated Apr. 15, 2015, for U.S. Appl. No. 14/479,140, Chan, MA, et al, filed Sep. 5, 2014.
Final Office Action dated Jul. 24, 2014, U.S. Appl. No. 14/179,709 by Quan, J., et al., filed Feb. 13, 2014.
Final Office Action dated Nov. 6, 2014, U.S. Appl. No. 14/158,682 by Quan, J., et al., filed Jan. 17, 2004.

(56) References Cited

OTHER PUBLICATIONS

International Search Report dated Sep. 11, 2014, 7 pgs., for International Application No. PCT/2013/031488 filed Mar. 21, 2014.
Layton, J.B., "User Space File Systems," Linux Magazine, accessed at http://www.linux-mag.com/id/7814, Jun. 22, 2010, pp. 1-4.
Non Final Office Action dated Nov. 3, 2014, for U.S. Appl. No. 13/772,163 by Quan, J., filed Feb. 20, 2013.
Non Final Office Action dated Oct. 23, 2014, for U.S. Appl. No. 14/252,674 by Chan, M.A., et al., filed Apr. 14, 2014.
Non-Final Office Action dated Aug. 26, 2014, for U.S. Appl. No. 14/267,823 by Chan, M.A., et al., filed May 1, 2014.
Notice of Allowance dated Aug. 12, 2014, U.S. Appl. No. 14/179,709 by Quan, J., et al., filed Feb. 13, 2014.
Notice of Allowance dated Sep. 3, 2014, U.S. Appl. No. 14/160,444 by Quan, J., et al., filed Jan. 21, 2014.
Restriction Requirement dated Aug. 29, 2014, for U.S. Appl. No. 14/252,674 by Chan, M.A., et al., filed Apr. 14, 2014.

* cited by examiner

510 Receive, from a near field communication (NFC) component of the first computing device, a signal indicative that an NFC component of the second computing device is in proximity to the NFC component of the first computing device 520 Detect that a second computing device is in proximity to the first computing device based on the signal 530 Determine whether the second computing device is a target device for a system restoration — No → (return to 510)

Yes

540 Transmit, from the first computing device to the second computing device, a user credential of the first computing device 550 Send, to the second computing device, a location where a cloud storage service stores a copy of system data of the first computing device such that the second computing device can restore a system state of the first computing device on the second computing device 560 Restore a system state of the first computing device on the second computing device 570 Determine whether a system restoration confirmation message is received from the second computing device Yes → 580 Delete the user credential and the system data from the first computing device No → 590 Retry steps 540-550

ELECTRONIC DEVICE SYSTEM RESTORATION BY TAPPING MECHANISM

PRIORITY CLAIM

This application is a continuation of, and claims priority to, U.S. patent application Ser. No. 14/042,509, filed Sep. 30, 2013, which claims the benefit of U.S. Provisional Patent Application No. 61/866,475, filed Aug. 15, 2013 and Provisional Patent Application No. 61/804,134, filed on Mar. 21, 2013, all of which are incorporated by reference herein in their entirety.

FIELD OF THE INVENTION

At least one embodiment of the present invention pertains to cloud computing, and more particularly, to automatically restore system state from another device by tapping two devices together.

BACKGROUND

Electronic devices, e.g., mobile phones, tablets, computers, mobile hotspot devices, etc., are usually equipped with data storage components (e.g., memory components) to maintain user information and system data in the devices. A user may desire to transfer or send content from one electronic device to another.

For instance, when acquiring a new mobile phone, a user may desire to transfer his data from his old mobile phone to the new mobile phone. The telephone seller or provider may provide a service to transfer the user's data from the old mobile phone to the new mobile phone. However, this service is often not offered when a user switches between different wireless service providers and may not be available for all types or models of electronic devices. Additionally, the user may be required to return to the point of purchase or other authorized service center at a later time with both electronic devices. This is especially true since the new device may have to be charged for several hours prior to being operative in order to begin the transfer of data. Such a return trip may be inconvenient for the user. Moreover, this type of transfer service is generally only available for transfers between specific mobile telephones. Accordingly, a user would not or cannot synchronize contact information between a PDA and a mobile phone using this service. Also, a user may only want to use the new mobile phone temporarily and prefers a convenient way to transfer the data back and forth between electronic devices by himself.

SUMMARY

Technology introduced here provides a mechanism for system restoration between computing devices by a tapping mechanism. A first device detects (e.g., via NFC) a second device in proximity. The first device transmits a user credential of the first device to the second device. Either directly or via a cloud service (e.g. a cloud storage service), the first device instructs the second device to download a copy of system data of the first device from the cloud storage service, instead of downloading from the first device. The second device is able to restore a system state of the first device on the second device, using the user credential and the system data.

Such a mechanism enables a user to restore a device's system state to another device without the need of entering password or manually transferring the data. The first and second devices can have system restoration application running, on either frontend or backend of operating systems of the devices. Once the devices detect (e.g., via NFC) that they are tapped together or in close proximity, the devices start the system restoration process automatically without user intervention. The system data of the first device is backed up on the cloud storage device. In some embodiments, there is no need to establish a large-bandwidth connection directly between the devices. Alternatively, the devices can establish connections directly between the devices for data communications. The first device can connect with the second device and the cloud storage service to begin transmitting system data of the first device from the cloud storage service to the second device, without transmitting through the first device.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
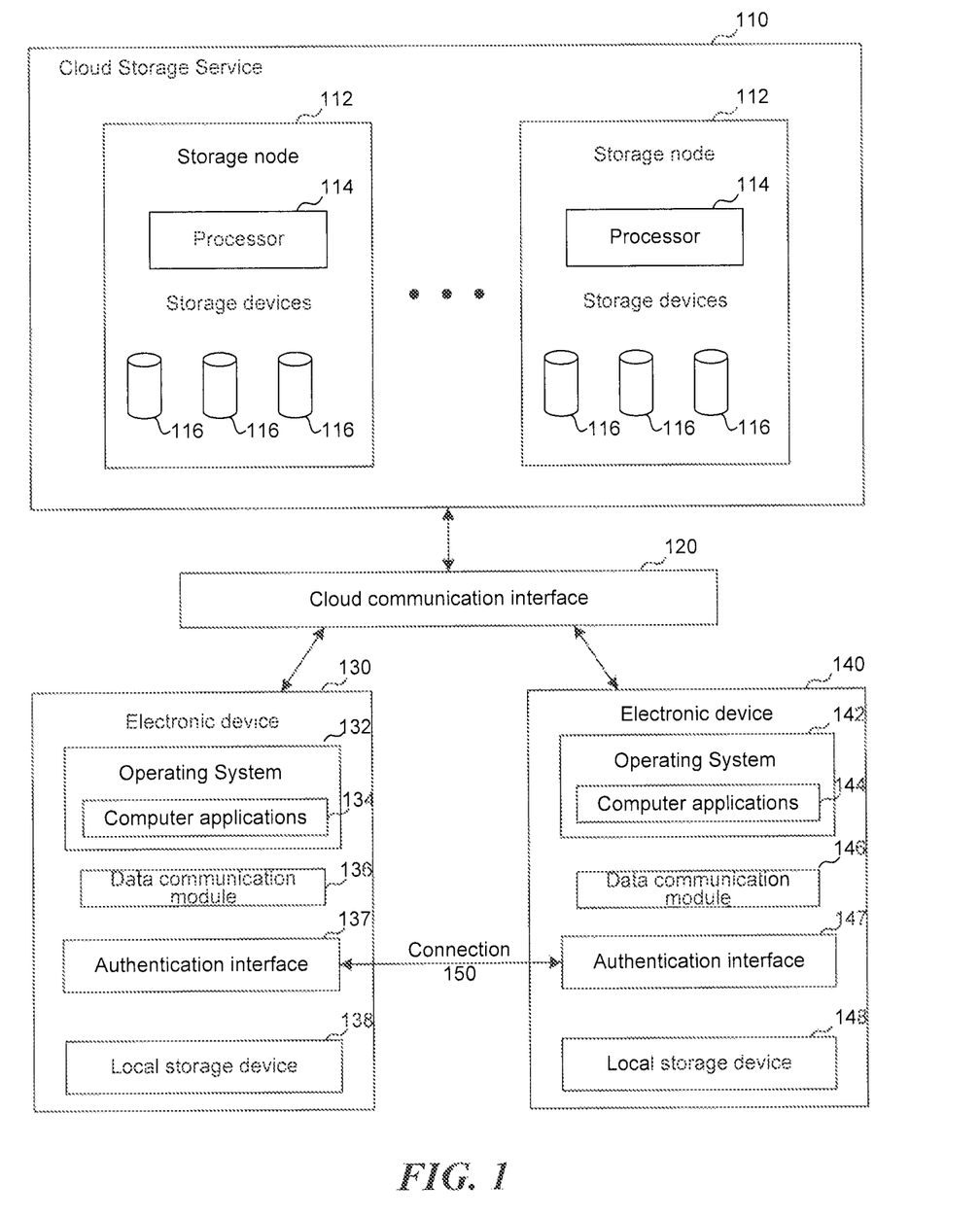
FIG. 1 illustrates an example system for electronic devices retrieving data from a cloud storage service.

FIG. 1 illustrates an example system for electronic devices retrieving data from a cloud storage service. The system includes a cloud storage service 110 configured to store data for electronic devices. In one embodiment, the cloud storage service 110 can be a storage cluster having computer nodes interconnected with each other by a network. The storage cluster can communicate with other electronic devices (e.g., electronic devices 130 or 140) via the Internet. The cloud storage service 110 can contain storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud communication interface 120 can also be included to receive data to be stored in the cloud storage service. The cloud communication interface 120 can include network communication hardware and network connection logic to receive the information from electronic devices. The network can be a local area network (LAN), wide area network (WAN) or the Internet. The cloud communication interface 120 may include a queuing mechanism to organize the received synchronization data to be stored in the cloud storage service 110. The cloud communication interface 120 can communicate with the cloud storage service 110 to send requests to the cloud storage service 110 for storing application state data and retrieving data.

An electronic device 130 includes an operating system 132 to manage the hardware resources of the electronic device 130. The electronic device 130 includes at least one local storage device 138 to store the operating system data, application data, and user data. The electronic device 130 can retrieve data from the cloud storage service 110 via the cloud communication interface 120. The electronic device 130 and 140 can be any computing devices, e.g., desktop computers, laptop computers, tablet computers, automobile computers, game consoles, smart phones, personal digital assistants, mobile hotspot devices, or other electronic devices capable of running computer applications, as contemplated by a person having ordinary skill in the art.

The computer applications 134 stored in the electronic device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The electronic device 130 or 140 can download data from the cloud storage service to update or change the operating system 132 or 142 on the electronic device 130 or 140. The electronic device 130 or 140 can download the data using its data communication module 136 or 146. Furthermore, the electronic device 130 or 140 can also update its own data to the cloud storage service. For instance, the cloud storage service can store the backup of the whole system of the electronic device 130 or 140.

The electronic devices 130 and 140 include authentication interface 137 and 147 in order to setup system restoration (also referred to as system migration) between electronic devices 130 and 140. For instance, the authentication interfaces 137 and 147 can be near field communication (NFC) interfaces to establish radio communication between electronic devices 130 and 140 by bring electronic devices 130 and 140 into close proximity, e.g., tapping the two devices 130 and 140 together. The authentication is established between the devices 130 and 140 via a connection 140 (e.g., an NFC connection) between the interfaces 137 and 147. Based on the communication through the NFC connection 140, the electronic devices 130 and 140 identify which of the devices 130 and 140 is the old device, and which of the devices 130 and 140 is the new device. The system restoration process will transfer data and user credentials to the new device.

In some embodiments, the old device does not need to directly migrate all information from itself to the new device. For instance, the device 130 can transfer the user credentials through the NFC connection 140 or a Bluetooth connection between devices 130 and 140. The electronic device 130 can prompt the cloud storage service to transfer a backup of the data on the electronic device 130 to the electronic device 140.

Figure 2:
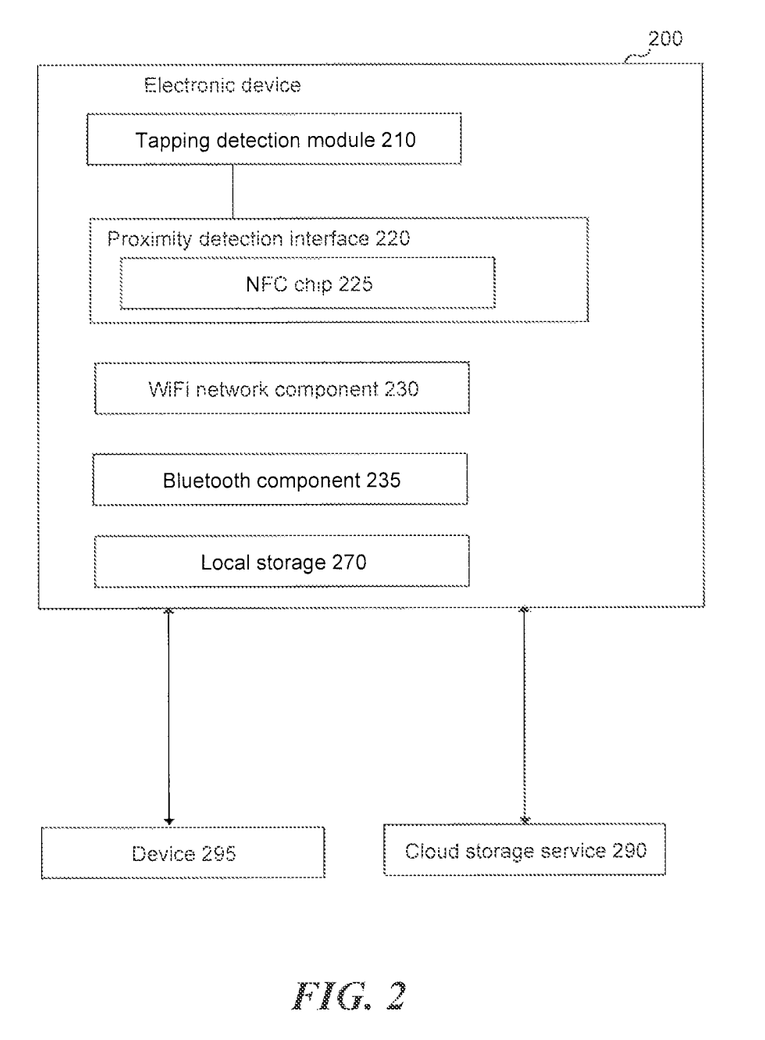
FIG. 2 illustrates an example of an electronic device capable of migrating system by tapping devices together.

FIG. 2 illustrates an example of an electronic device capable of migrating system by tapping devices together. The electronic device 200 includes a tapping detection module 210. The tapping detection module 210 is capable of detecting that the electronic device 200 is tapped together with another device. For instance, the tapping detection module can recognize the tapping by examining signals from an accelerometer. The tapping detection module can be an application or service running on the electronic device 200. The tapping detection module communicates with a proximity detection interface 220. The proximity detection interface 220 is the hardware interface designed to detect another device in the close proximity of the electronic device 200. For instance, the tapping detection module 210 can recognize the tapping by examining signals from an accelerometer of the proximity detection interface 220.

For instance, the proximity detection interface 220 can include an NFC chip 225. The NFC chip 225 generates a radiofrequency field. If another NFC chip or NFC tag (e.g., included in another device) is in the close proximity of the NFC chip 225, the NFC chip 225 detects a magnetic induction due the nearby NFC chip or tag. The NFC chip 225 sends a signal to the proximity detection interface 220. In turn, the proximity detection interface 220 generates and sends an event to the tapping detection module 210.

In some other embodiments, the proximity detection interface 220 can be implemented using other mechanisms. For instance, the proximity detection interface 220 can include a short code confirmation mechanism. The electronic device 200 can generate a four digit pin and display the four digit pin on its display screen. A user can enter the displayed four digit pin into another device. The other device sends a confirmation including the four digit pin to the electronic device 200. The proximity detection interface 220 examines the confirmation message and generates and sends an event to the tapping detection module 210.

Alternatively, the proximity detection interface 220 can include a microphone and a speaker. The proximity detection interface 220 generates an audio message encoded with a code, and then plays the audio message through the speaker. A microphone on another device receives the audio message and decodes the code from the audio message. Then the other device generates an audio confirmation message encoded with the code and plays the audio confirmation message through its speaker. The microphone of the proximity detection interface 220 receives the audio confirmation message and determines whether the code within the audio confirmation message matches with the original code. If the codes match, the proximity detection interface 220 generates and sends an event to the tapping detection module 210.

In an alternative embodiment, such an audio tapping detection can be achieved in a single-way mechanism. The proximity detection interface 220 generates an audio message encoded with an instruction, and then plays the audio message through the speaker. A nearby device receives the audio message and decodes the instruction from the audio message. The nearby device can follow the instruction, or even authenticate with other mediums.

The electronic device 200 can further include WiFi network component 230 for communication with other devices and cloud storage service (e.g., cloud storage service 110 in FIG. 1). The electronic device 200 can also include Bluetooth component 235 for communication with other devices. For instance, the electronic device 200 can transfer the user credentials through the NFC chip 225 or the Bluetooth component 235. The electronic device 200 can also prompt the cloud storage service 290 via the WiFi network component to transfer a backup of the data on the electronic device 200 to other devices.

Once the tapping detection module 210 detects an event indicating that the electronic device 200 is tapped together with another device, the electronic device 200 contacts and sends an inquiry to the cloud storage service 290 to determine whether a current backup of the data of the electronic device 200 exists in the cloud storage service 290. The cloud storage service 290 can be implemented on a web server or on a cloud computing service. The cloud storage service 290 replies to the electronic device 200 about whether a current backup of the data of the electronic device 200 exists in the cloud storage service 290. The inquiry can be sent out via a WiFi network component 230 that has been connected to a WiFi or mobile network. Likewise, the reply can be received via the WiFi network component 230.

The reply message sent by the cloud storage service 290 can include a location link indicating where to retrieve the backup of the data of the electronic device. For instance, the location link may include a network address of the cloud storage service 290 that stores in the backup. The electronic device 200 sends the backup location to the other device 295 via the NFC chip 225, the Bluetooth component 235 or the WiFi network component 230. The other device 295 is able to download a copy of the data of the electronic device 200 store in the cloud storage service 290 based on the location link.

The data backup can be distributed to the other device 295 as an over-the-air update. The other device 295 can receive data backup as a full image of the operating system, or as an incremental copy of the operating system including changes on the operating system or changes to the framework or applications in the operating system. After receiving the data backup, the other device 295 may need to reboot for the update to take effect.

In some embodiments, the backup data includes updates that do not require the other device 295 to reboot. For instance, the data backup can include asset changes, e.g. changes to the visuals of icons and taskbar or pre-load of applications. For these changes, the device 295 can directly apply the updates without the need to reboot.

If there is any data duplication between the electronic device 200 and the other device 295. The cloud storage service 290 does not need to send the entire data backup of electronic device 200 to the device 295. The device 295 can retrieve only the difference between the electronic device 200 and the other device 295.

Figure 3:
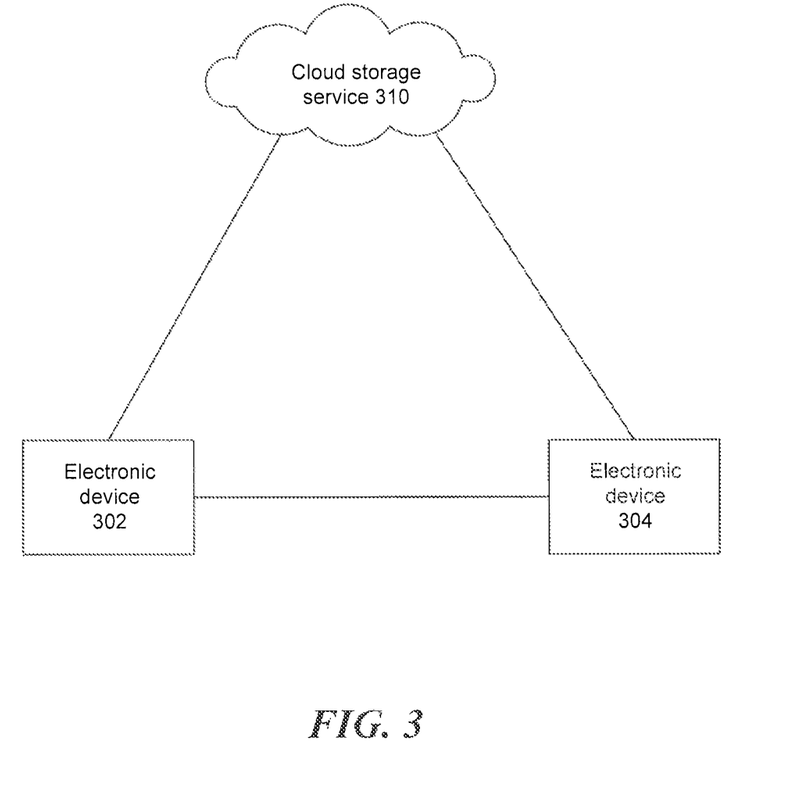
FIG. 3 illustrates an example environment for system restoration between electronic devices by a tapping mechanism.

FIG. 3 illustrates an example environment for system restoration between electronic devices by a tapping mechanism. An electronic device 302 detects an electronic device 304 in proximity. In some embodiments, the electronic device 302 detects proximate device by using a near field communication (NFC) chip or tag. From the perspective of a user, the electronic devices 302 and 304 are tapped together. The electronic device 302 transmits a user credential of the device 302 to the electronic device 304. After the electronic device 304 is detected, the electronic device 304 receives an instruction to download copy of system data of the device 302 form a cloud storage service 310. There is no need to establish a direct large-bandwidth connection between electronic devices 302 and 304, since the cloud storage service maintains a current copy of the system data of electronic device 302. The electronic device 302 can directly send the instruction to the electronic device 304, e.g., via the NFC connection or other connections including low-power Bluetooth. Alternatively, the electronic device 302 can send the instruction to the cloud storage service 310, and the cloud storage service 310 in turn relays the instruction to the electronic device 304. The electronic device 304 is able to restore a system state of the electronic device 302 on the device 304, using the user credential and the system data.

The electronic device 304 can receive the instruction using both push and pull mechanisms. In the pull mechanism, the electronic device 304 will initiate the request of the instruction from the cloud storage service 310. In the push mechanism, cloud storage service 310 can initiate the request to send the instruction to the electronic device 304. The electronic device 304 will include a module to periodically listen or check any push request from the cloud storage service 310.

Figure 4:
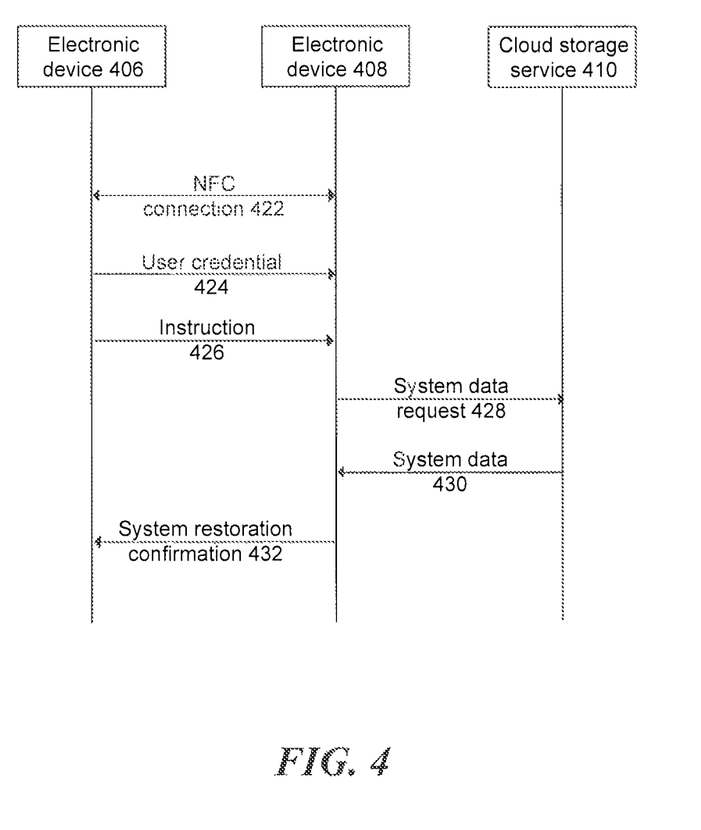
FIG. 4 illustrates an example of a message sequence chart for system restoration between electronic devices by a tapping mechanism.

FIG. 4 illustrates an example of a message sequence chart for system restoration between electronic devices by a tapping mechanism. The electronic device 406 is a source device including at least one user credential and system data. The electronic device 406 runs a system restoration application designed to setup a process to restore the system state of the electronic device 406 in another target device. The electronic device 408 is the target device, which can be a new device or a refreshed device. After the system restoration, a user of the electronic device 406 can continue to use the electronic device 408 as if the electronic device 408 was the electronic device 406, because the electronic device 408 restores the system state of the device 406 on itself.

Two electronic devices 406 and 408 are brought together in a close proximity by a user ("tapping"). The NFC components (e.g., NFC chips or tags) in the electronic devices 406 and 408 detect the proximate devices and establish a NFC connection 422 between the devices 406 and 408.

Once the NFC connection 422 is established, the electronic device 406 sends the user credential 424 to the electronic device 408. The electronic device 406 can send the user credential 424 via the NFC connection if the bandwidth of the NFC connection 422 allows transferring the user credential 424.

The electronic device 406 further transmits an instruction 426 to the electronic device 408. The instruction 426 includes a location where the cloud storage service 410 stores the backup copy of the system data of the electronic device 406.

Based on the instruction 426, the electronic device 408 can request (system data request 428) a copy of the system data of the electronic device 406 from the cloud storage service 410. Accordingly, the cloud storage service 410 can transmit the system data 430 to the electronic device 408. Once the electronic device 408 receives the system data 430, the electronic device 408 restore the system state of the electronic device 406 by using the system data 430 and the user credential 424.

After a successful system restoration, optionally the electronic device 408 can send a system restoration confirmation 432 back to the electronic device 406. The confirmation 432 may be sent via the NFC connection or other types of wireless connection, e.g. WiFi connection or Bluetooth connection. Upon receiving the confirmation 432, optionally the electronic device 406 can remove the user credential and system data from device 406 (e.g. by a factory restore hard reset). Once the electronic device 406 contains no personal credential or person data, a user can recycle or resell the electronic device 406 and continue to use the new electronic device 408, without a need of manually transferring the user credential or data between the devices 406 and 408.

Figure 5:
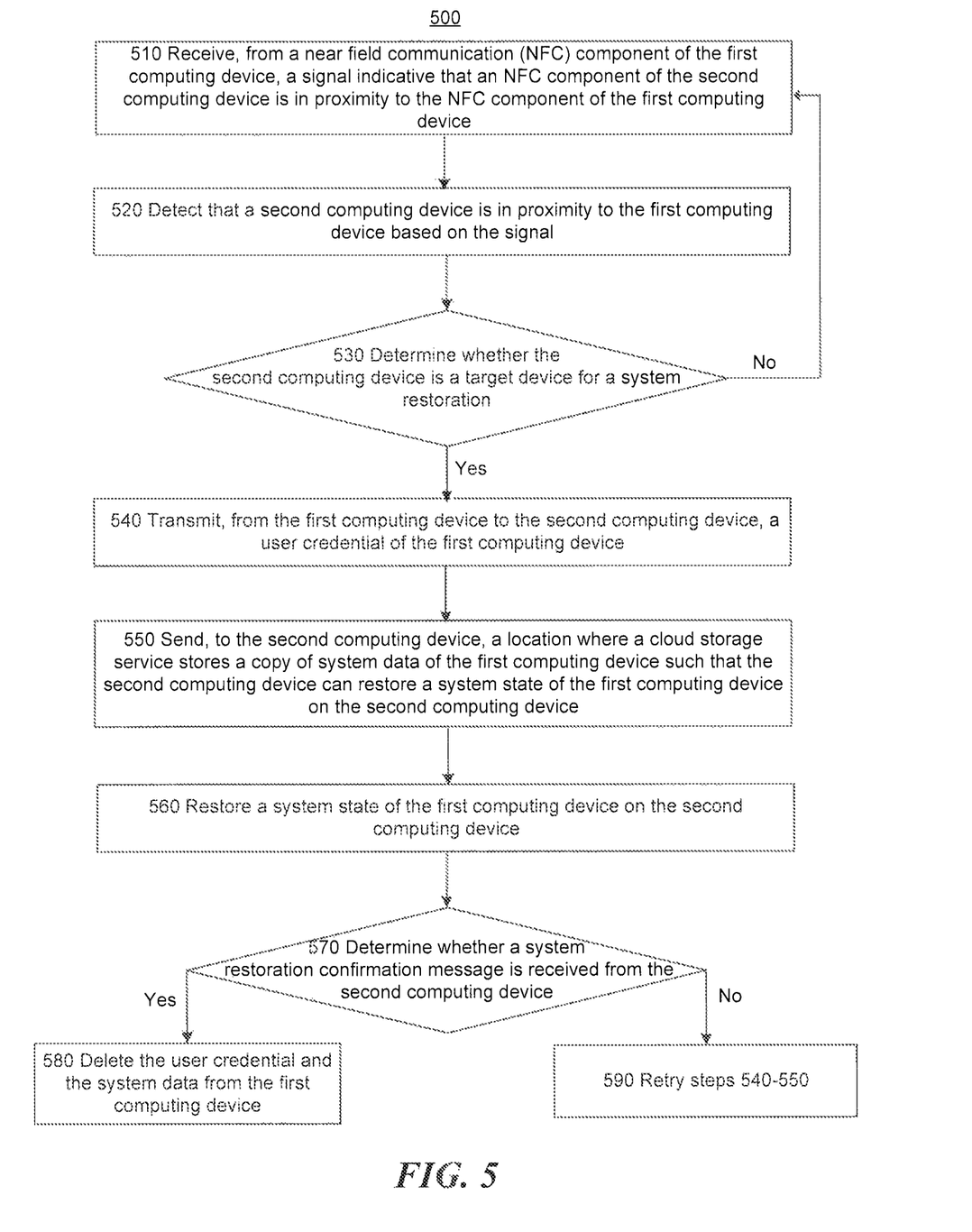
FIG. 5 illustrates an example of system restoration process between two computing devices.

FIG. 5 illustrates an example of system restoration process between two computing devices. The system restoration process 500 starts at step 510, where a first computing device receives, from a near field communication (NFC) component of the first computing device, a signal indicative that an NFC component of the second computing device is in proximity to the NFC component of the first computing device. The NFC components of the first and second computing devices can include powered NFC chips or unpowered NFC tags.

At step 520, the first computing device detects that a second computing device is in proximity to the first computing device based on the signal.

Alternatively, the first computing device can detect proximate device by other mechanisms. For instance, the first computing device can send an initial audio message encoded with a first code. The second computing device receives the audio message and decodes the first code. The second computing device sends another confirming audio message encoding the code. The first computing device receives the confirming audio message encoded with a second code. If the first code matches the second code, the first computing device detects a proximate device.

The first computing device can also detect proximate device by short code or barcode. For example, the first computing device can display a short code or a barcode on a screen of the first computing device. In case of a short code, a user inputs the short code to the second computing device, and the second device sends a confirming message with the short code. In case of a barcode, the second device can capture an image of the barcode (e.g., two-dimensional barcode, also called as matrix barcode) and sends a confirming message with the information encoded in the barcode. The first device receives the message from the second computing device including the short code or information encoded in the barcode. If the short code or encoded information matches with the information display on the first device, the first computing device detects a proximate device. Similarly the proximate device can be detected by a lock screen image. Another device can recognize the lock screen image in a similar way as the barcode.

At step 530, the first computing device determines whether the second computing device is a target device for a system restoration. The first computing device can make the determination in various ways. For instance, the first computing device can receive a message from the second computing device indicative that the second computing device is the target device which does not contain user credential. Alternatively, the first computing device can receive a user instruction indicative that the second computing device is the target device for the system restoration. If the second computing device is not the target device for the system restoration, the process 500 turns back to the beginning of the process. If the second computing device is the target device for the system restoration, the process 500 proceeds to step 540.

At step 540, the first computing device transmits, from the first computing device to the second computing device, a user credential of the first computing device. The transition of the user credential can be achieved, e.g., via are NFC component or a Bluetooth component of the first computing device. The user credential is transmitted from the first computing device to the second computing device such that the second computing device can restore a system state of the first computing device without a need of receiving a password associated with the user credential.

At step 550, the first computing device sends, to the second computing device, a location where a cloud storage service stores a copy of system data of the first computing device such that the second computing device can restore a system state of the first computing device on the second computing device. The location can be sent directly, e.g., via an NFC component or a Bluetooth component of the first computing device. Alternatively, the first computing device can instruct the cloud storage service to send the location information to the second computing device. The system data can include contacts information, audios, videos, images, applications, application running states, or other types of system data necessary for the second computing device to restore a system state of the first computing device on the second computing device.

The second computing device can have an application for restoring the system state running on the second computing device, or have an application that can communicate with the first computing device to pull down system data. At step 560, the second computing device restores a system state of the first computing device on the second computing device. At step 570, optionally the first computing device determines whether a system restoration confirmation message is received from the second computing device. Alternatively, the server can determine whether a system restoration confirmation message is received from the second computing device. For instance, when a server detects that a device has successfully registered via NFC tap credentials, the server can push an unregister command to the first device to remote the credentials.

The confirmation message can be received directly from the second computing device, e.g., via an NFC component or a Bluetooth component of the first computing device. Alternatively, the second computing device can instruct the cloud storage service to send the confirmation message to the first computing device.

Optionally, If the first computing device receives the system restoration confirmation message from the second computing device, at step 580, the first computing device can delete the user credential and the system data from the first computing device.

Optionally, If the first computing device does not receive the system restoration confirmation message from the second computing device, at step 590, the first computing device can retry the steps 540-550 to send the user credential and the system data to the second computing device.

The deletion in the first computing device is useful in scenario that a user wants to only be logged in and use one computing device at a time. In some embodiments, a first computing device does not need to perform deletion as in steps 580 and 590.

In some alternative embodiment, the second computing device serves as a guest-mode instance of the first computing device. The transmitted user credential is a temporary user credential. The temporary user credential can expire after a predetermined time period or expire after a predetermined system event in the second computing device. The predetermined system event can include, e.g., screen turning off, device turning off, device inactive for a predetermined time period, or receiving a user instruction to end the validity of the credential.

Figure 6:
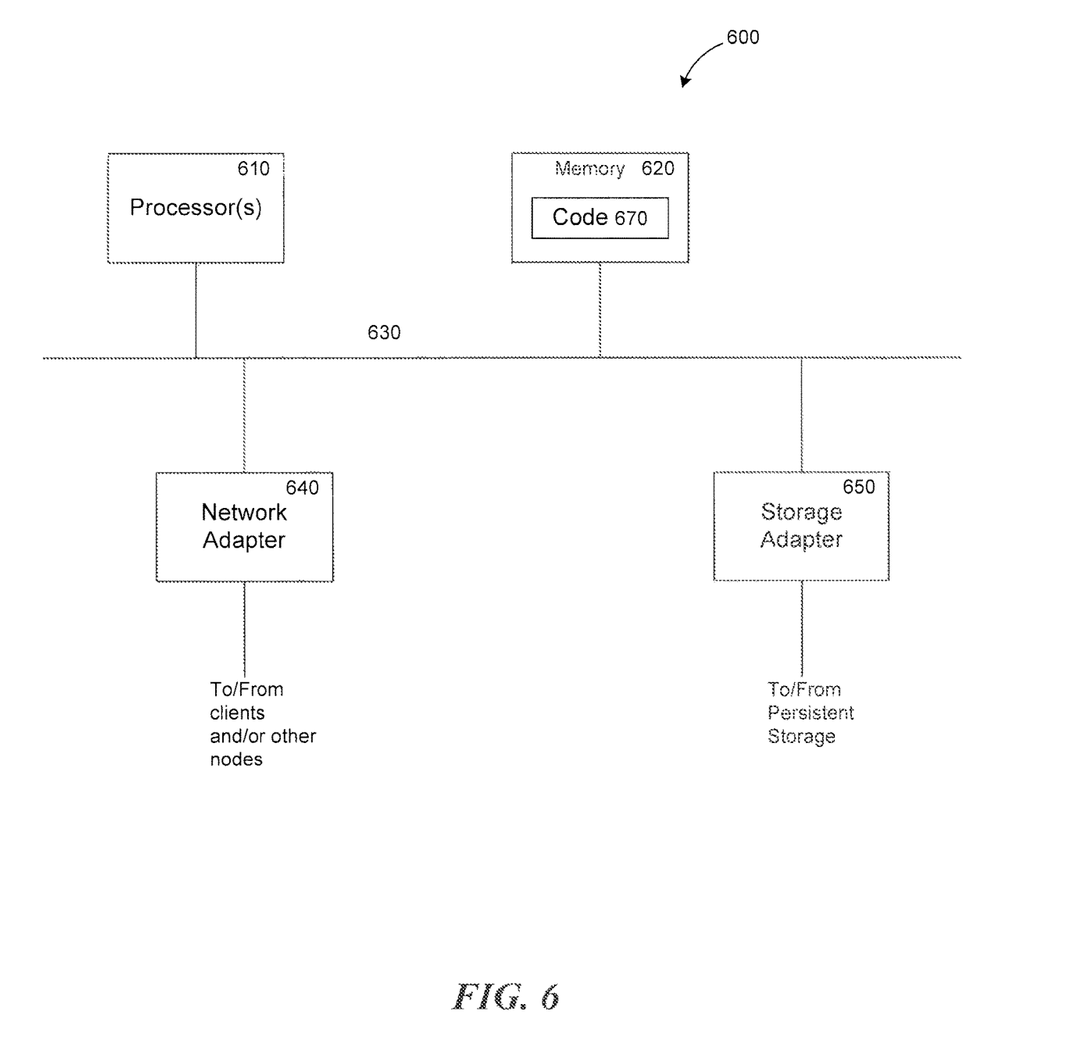
FIG. 6 is a high-level block diagram showing an example of the architecture of a computer device, which may represent any computing or electronic device or any server within a cloud storage service as described herein.

FIG. 6 is a high-level block diagram showing an example of the architecture of a computer device, which may represent any computing or electronic device or any server within a cloud storage service as described herein. The server 600 includes one or more processors 610 and memory 620 coupled to an interconnect 630. The interconnect 630 shown in FIG. 6 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus; a small computer system interface (SCSI) bus, a universal serial bus (USB), IIC (I2C) bus, or an Institute of Electrical and Electronics Engineers (IEEE) standard 1394 bus, also called "FIREWIRE®".

The processor(s) 610 is/are the central processing unit (CPU) of the server 600 and, thus, control the overall operation of the server 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the server 600. The memory 620 represents any form of random access memory (RAM), read-only memory (ROM), flash memory, or the like, or a combination of such devices. In use, the memory 620 may contain a code 670 containing instructions according to the techniques disclosed herein.

Also connected to the processor(s) 610 through the interconnect 630 are a network adapter 640 and a storage adapter 650. The network adapter 640 provides the server 600 with the ability to communicate with remote devices, over a network and may be, for example, an Ethernet adapter or Fibre Channel adapter. The network adapter 640 may also provide the server 600 with the ability to communicate with other computers. The storage adapter 650 allows the server 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the server 600 by downloading it from a remote system through the server 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed:

1. A method of system restoration, the method comprising:

detecting that a source computing device is in proximity to a target computing device;

receiving, by the target computing device, from the source computing device, via a near field communication or a short range wireless communication, an instruction to download a copy of system data of the source computing device from the cloud storage service, and further receiving, by the target computing device, from the source computing device, a user credential of the source computing device;

retrieving, by the target computing device, from the cloud storage service, in response to the instruction received from the source computing device, a copy of the system data of the source computing device; and restoring, by the target computing device, a system state of the source computing device on the target computing device by using the user credential received from the source computing device and the copy of the system data of the source computing device retrieved from the cloud storage service, wherein the user credential expires on the target computing device after a predetermined system event in the target computing device, the predetermined system event including at least one of: screen shut down on the target computing device; shut down of the target computing device; or inactivity of the target computing device for a threshold time period.

2. The method of claim 1, further comprising:

receiving, by the target computing device, via a near field communication from the source computing device, location information as to where the cloud storage service stores the copy of the system data of the source computing device.

3. The method of claim 1, wherein, the target device receives, from the source computing device, via a near field communication component of the target computing device, the instruction to download the copy of the system data of the source computing device from the cloud storage service.

4. The method of claim 1, wherein the target computing device is a new or refreshed device that contains no user credential.

5. The method of claim 1, further comprising sending a message to the source computing device indicative that the target computing device does not contain the user credential, and that the target computing device is a target for restoring the system state.

6. An apparatus for system restoration, the apparatus comprising:

a near field communication component configured to detect that a source computing device is in proximity to the apparatus; and at least one processor configured to:

receive, from the source computing device, via a near field communication or a short range wireless communication, an instruction to download a copy of system data of the source computing device from the cloud storage service, and further receive, from the source computing device, a user credential of the source computing device;

retrieve, from the cloud storage service, in response to the instruction received from the source computing device, a copy of the system data of the source computing device; and restore a system state of the source computing device on the apparatus by using the user credential received from the source computing device and the copy of the system data of the source computing device retrieved from the cloud storage service, wherein the user credential expires on the apparatus after a predetermined system event in the apparatus, the predetermined system event including at least one of: screen shut down on the apparatus; shut down of the apparatus; or inactivity of the apparatus for a threshold time period.

7. The apparatus of claim 6, wherein the at least one processor is further configured to:

receive via a near field communication from the source computing device, location information as to where the cloud storage service stores the copy of the system data of the source computing device.

8. The apparatus of claim 6, wherein the user credential is received via the near field communication component of the apparatus.

9. The apparatus of claim 6, wherein the apparatus is a new or refreshed device that contains no user credential.

10. The apparatus of claim 6, wherein the at least one processor is further configured to send a message to the source computing device indicative that the apparatus does not contain the user credential, and that the apparatus is a target for restoring the system state.

11. A method of system restoration, the method comprising:

detecting, at a first computing device, that a second computing device is in proximity to the first computing device;

transmitting, from the first computing device to the second computing device, via a near field communication or a short range wireless communication, an instruction to download a copy of system data of the first computing device from the cloud storage service, and further transmitting, to the second computing device, a user credential of the first computing device; and sending, from the first computing device to the second computing device, a location where a cloud storage service stores a copy of system data of the first computing device, wherein the second computing device retrieves, from the cloud storage service, in response to the instruction received from the source computing device, a copy of the system data of the source computing device;

wherein the second computing device uses the user credential received from the first computing device and the copy of the system data received from the cloud storage service to restore the system state of the first computing device on the second computing device, wherein the user credential expires on the second computing device after a predetermined system event in the second computing device, the predetermined system event including at least one of: screen shut down on the second computing device; shut down of the second computing device; or inactivity of the second computing device for a threshold time period.

12. The method of claim 11, further comprising, based at least partially on the detecting that the second computing device is in proximity to the first computing device, determining that the second computing device is a target device for a system restoration.

13. The method of claim 11, further comprising:

receiving a message from the second computing device; and determining, based on the received message, that the second computing device does not contain the user credential of the first computing device and the second computing device is a target device for a system restoration.

14. The method of claim 11, further comprising executing a system restoration application in the first computing device.

15. The method of claim 11, wherein the detecting comprises receiving, from a near field communication component of the first computing device, a signal indicative that a near field communication component of the second computing device is in proximity to the near field communication component of the first computing device.

16. The method of claim 15, wherein the near field communication component of the first computing device includes a near field communication tag.

17. The method of claim 11, wherein the detecting comprises:

sending an initial audio message encoded with a first code;

receiving a confirming audio message encoded with a second code; and determining that the first code matches the second code.

18. The method of claim 11, wherein the detecting comprises:

displaying a short code, a barcode, a matrix barcode, or a lock screen image on a screen of the first computing device; and receiving a message from the second computing device including the short code or information encoded in the barcode, the matrix barcode, or the lock screen image.

19. The method of claim 11, wherein the transmitting comprises transmitting, via a near field communication component of the first computing device to the second computing device, the user credential of the first computing device.

20. The method of claim 11, wherein the sending comprises sending, via a near field communication component of the first computing device to the second computing device, the location where the cloud storage service stores the copy of the system data of the first computing device.

* * * * *